May 7, 1940.  J. J. WATSON  2,199,552
HIGH PRESSURE VENTED GUIDE PLUG CLAMP
Filed Sept. 24, 1938  2 Sheets-Sheet 1
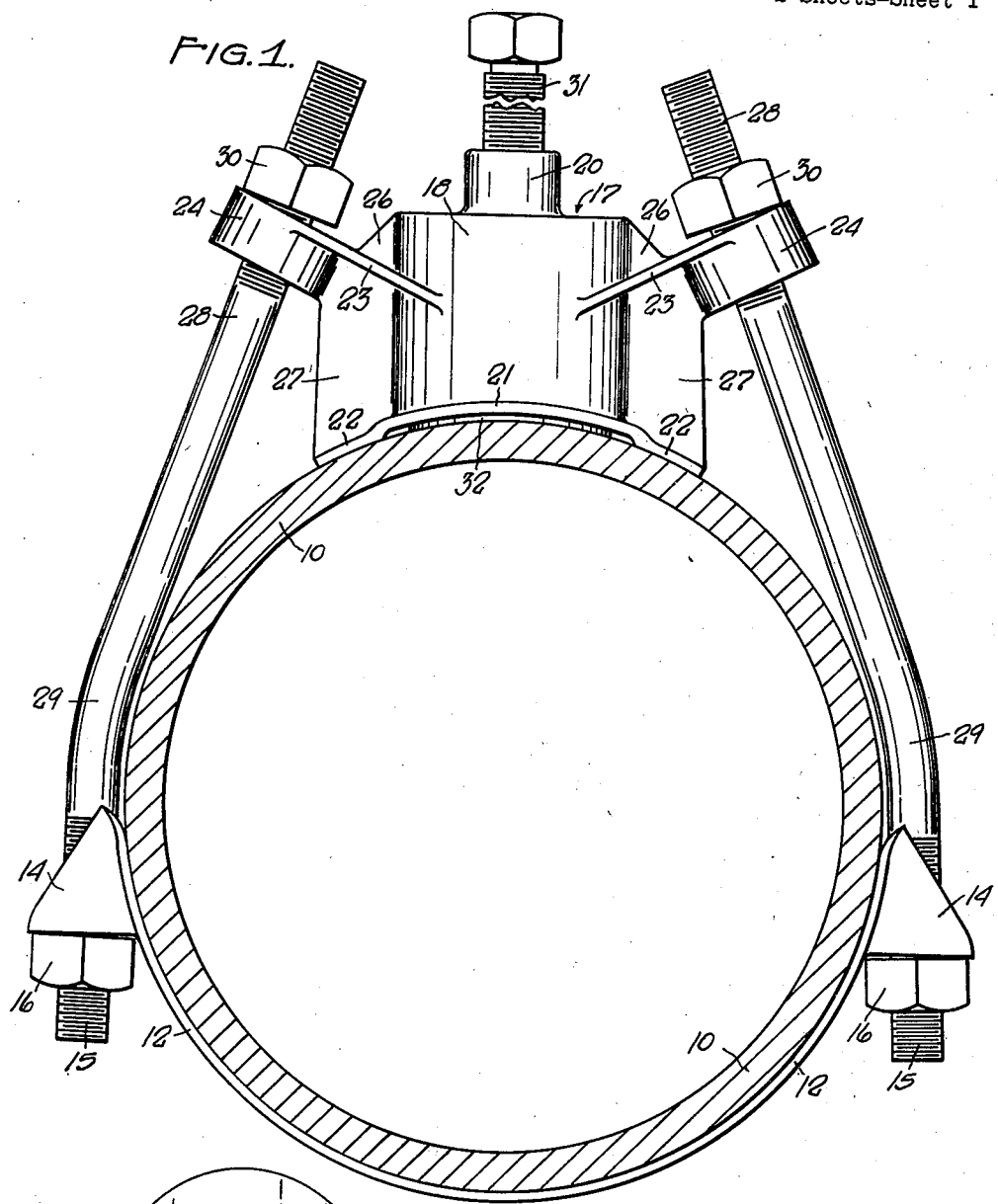
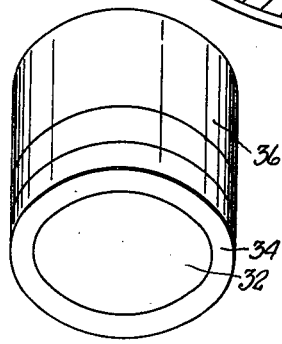
JOHN J. WATSON.
INVENTOR.
BY Oltsch & Knoblock
ATTORNEYS.

May 7, 1940.　　　　J. J. WATSON　　　　2,199,552
HIGH PRESSURE VENTED GUIDE PLUG CLAMP
Filed Sept. 24, 1938　　　2 Sheets-Sheet 2
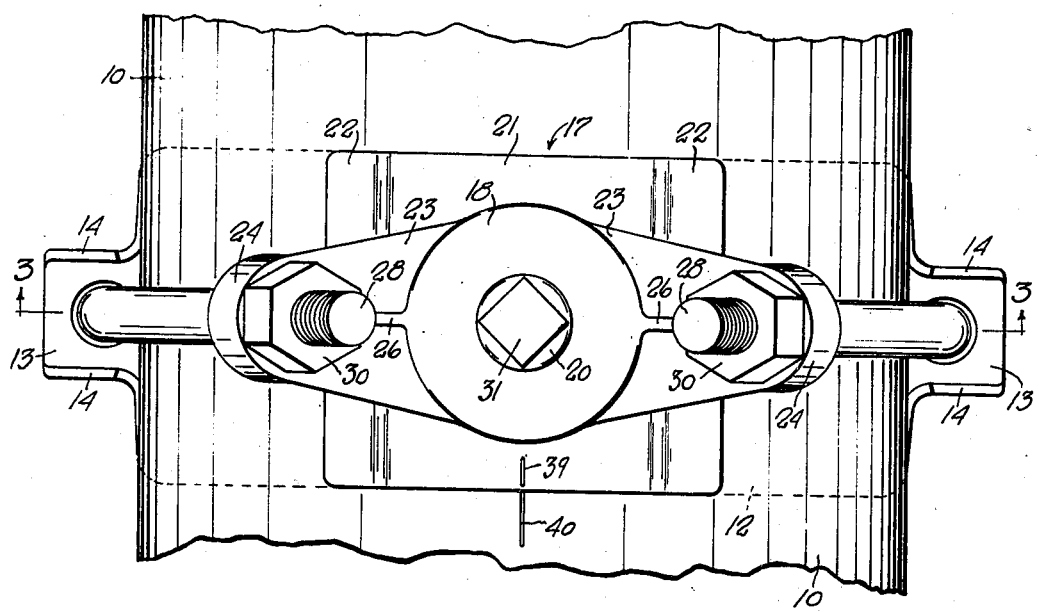
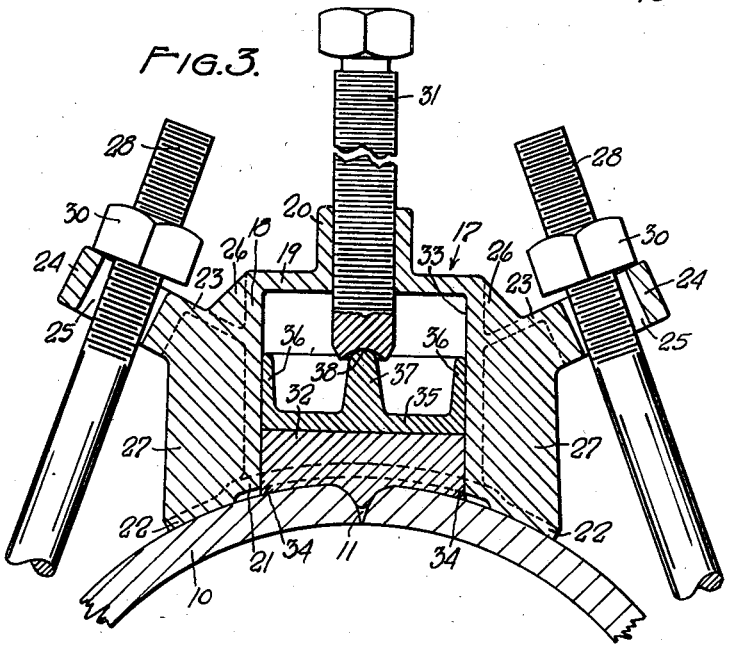
JOHN J. WATSON.
INVENTOR.
BY Oltsch & Knoblock
ATTORNEYS.

Patented May 7, 1940

2,199,552

UNITED STATES PATENT OFFICE 2,199,552

HIGH PRESSURE VENTED GUIDE PLUG CLAMP

John J. Watson, Palestine, Tex., assignor to M. B. Skinner Company, South Bend, Ind., a corporation of Indiana Application September 24, 1938, Serial No. 231,527

3 Claims. (Cl. 138—99)

This invention relates to high pressure vented guide plug clamps adapted to seal leaks in pipes containing liquids or gases under very high pressure.

The greatest problem which is faced in attempting to seal a leak in a pipe whose contents are under high pressure is the matter of locating and applying the clamp, and the sealing element associated therewith, accurately and effectively to the leaking area of the pipe against the action of the leaking material. Thus, in a gas pipe wherein the gas pressure may range from several hundred pounds per square inch to over a thousand pounds per square inch, the gas escapes at the leak in a jet at extremely high velocity, and it is extremely difficult to apply and hold a clamp in sealing position while the same is being tightened. Another condition which is encountered is the tendency of the escaping gas jet to "wire cut" the sealing gasket and destroy its sealing qualities.

It is, therefore, the primary object of this invention to provide a pipe clamp with means for venting escaping fluids during its application and prior to seating of a sealing member on the leaking area.

A further object is to provide a clamp having a guide pocket receiving a sealing element, and means for shifting the element in said pocket.

A further object is to provide a clamp having a head adapted to cover the leaking area of the pipe, said head mounting a sealing element and being provided with a vent.

A further object is to provide a device of this character with a sealing gasket formed of soft rubber and having a hard rubber margin to resist extrusion and "wire cutting."

Other objects will be apparent from the description and appended claims.

In the drawings:

Fig. 1 is a cross-sectional view of a pipe having my clamp mounted thereon.

Fig. 2 is a top plan view of the clamp.

Fig. 3 is a fragmentary sectional view taken on line 3—3 of Fig. 2.

Fig. 4 is a perspective view of the sealing gasket assembly.

Referring to the drawings, which illustrate the preferred embodiment of the invention, the numeral 10 designates a pipe having a leak 11 therein.

My clamp is adapted to encircle the pipe at the leak, and comprises a substantially semi-circular band 12 having flanges 13 bent outwardly at its ends and each reinforced by spaced parallel flanges 14, said flanges 13 and 14 preferably being integral with said band. Each flange 13 is provided with a central aperture through which one end 15 of a drawbolt passes. A nut 16 is threaded on the draw bolt and bears against flange 13. Band 12 seats against the pipe opposite the leaking area thereof.

A cast metal head 17 is adapted to cover the leaking area of the pipe and comprises a central cylindrical body 18 having an outer end wall 19 from which an internally screw-threaded collar 20 projects. A concavo-convex flange 21 substantially conforming to the curvature of pipe 10, projects laterally from the inner open end of cylindrical body 18, said flange terminating at opposite ends thereof in off-set curved bearing portions 22. A pair of arms 23 extend angularly from opposite sides of body 18 intermediate the length thereof, and in V-shaped relation. The outer ends of arms 23 terminate in enlarged cylindrical heads 24, each having a passage 25 centrally therethrough. Web flanges 26 extend between the arms 23 and body 18 to reinforce said arms outwardly; and web flanges 27, each extending between arm 23, head 24, body 18 and flange portion 21, 22, reinforce the inner side of said arms and heads. One end 28 of each draw bolt extends through passage 25, said draw bolts being bent at 29 intermediate their ends to pass clear of the pipe 10. A nut 30 threaded on draw bolt end 28 seats on head 24. A set screw 31 is threaded in collar 20, and preferably has a concaved inner end.

A rubber disc 32 of a diameter to fit snugly and at the same time slide freely within the bore 33 of cylindrical body 18, constitutes a leak seal. Disc 32 is preferably formed of soft rubber for the major portion thereof, but is provided with a marginal ring 34 of hard rubber at one end. The opposite end of disc 32 is cemented to the flat end 35 of a cup-shaped metal member having cylindrical marginal guide wall 36 which has a sliding and guiding fit within bore 33 of body 18. The cup-shaped member has a tapered central projection 37 having a rounded end 38 on which the concaved inner end of set screw 31 is adapted to bear.

In use, the clamp is assembled around the pipe to one side of the leak, with the nuts tightened on the draw bolts to the greatest extent which will still permit sliding of the assembly on the pipe. The clamp is then shifted with cylindrical body 18 of the head centered over the leak 11, which may be readily accomplished by registering centering indicia 39 on flange 21 with marks 40 previously made on the pipe. The clamp is then locked to place by tightening whichever of the nuts 16 or 30 are most conveniently accessible, the curvature 29 of the draw bolts permitting them to be drawn and tightened at either end.

When the head is placed over the leak, the force of the fluid escaping therefrom acts against the sealing disc 32 to force the same outwardly in the bore 33 of cylindrical body 18. This permits the gas to be vented at opposite sides of flange 21 which is positioned in spaced bridging relation to the leaking area of the pipe by end bearing portions 22 which rest on the pipe in spaced relation to the leak. This venting of escaping fluid dissipates the normal displacing force thereof, and permits tightening of the clamp with minimum effort as against dislocating action of the escaping fluid against the head. When the clamp has been effectively clamped in place, the set screw 31 is rotated to shift sealing disc 32 inwardly against the pipe through the medium of the interposed cup-shaped member 35. The soft rubber of the disc permits the disc to assume, under pressure, any contour required to effectively seal the leak, as best illustrated in Fig. 3. At the same time the hard rubber ring 34 serves to prevent extrusion of the disc between the pipe and flange 21 at the open end of the guide bore, said ring 34 being of a thickness greater than the spacing of said pipe and flange, and also prevents "wire cutting" of the jet of escaping fluid before the disc is fully seated on the pipe to seal the leak. Except for the projecting sealing end of the disc 32 defined by hard rubber ring 34, the disc is completely confined by body 18 and member 35.

The threaded connection between the clamp collar 20 and set screw 31 minimizes the force necessary to be exerted to apply the sealing disc against the action of the leaking fluid.

It will thus be seen that the clamp is easy to apply without regard to the location of the leak on the pipe; that the sealing disc is confined in operative relation to the clamp before seating thereof on the pipe; that leaking fluid is vented by the clamp while the clamp is being tightened to operative position; that the sealing disc is simply and easily seated on the pipe by a guided movement; and that the sealing disc is prevented from extruding at its unconfined sealing end, and is reinforced against "wire cutting."

I claim:

1. In combination, a pipe having a leak, a head covering said leak and having a cylindrical bore, off-set bearing portions carried by said head and engaging said pipe to position said head in spaced relation to said pipe, means for clamping said head on said pipe, a gasket disc slidable within said bore, and means for urging said gasket against said pipe in sealing relation thereto.

2. In a pipe leak sealing device, a clamp element adapted to be spaced from a pipe and having a pocket, a soft rubber gasket fitting snugly and slidably in said pocket and projecting therefrom at one end, said projecting gasket end having an integral hard rubber margin of greater longitudinal dimension than the spacing of said clamp element and pipe, and means for pressing said gasket against said pipe including a member having a snug sliding fit in said pocket.

3. Pipe leak sealing means comprising a clamp adapted to encircle a pipe at a leak and having a chamber therein normally open to atmosphere, the axis of said chamber extending substantially radially of said pipe, a soft rubber gasket fitting snugly in said chamber to be confined thereby and slidable axially of said chamber, one end of said gasket having a hard rubber margin, and means on said clamp for pressing said gasket end against the pipe with said margin preventing extrusion.

JOHN J. WATSON.